United States Patent
Olausson et al.

(10) Patent No.: US 12,151,436 B2
(45) Date of Patent: Nov. 26, 2024

(54) BLAST NOZZLES FOR ADDITIVE MANUFACTURING AND METHODS FOR USING THE SAME

(71) Applicant: Arcam AB, Mölnlycke (SE)

(72) Inventors: Stefan Olausson, Gothenburg (SE); Håkan Sjölander, Gothenburg (SE)

(73) Assignee: Arcam AB, Mölnlycke (SE)

( * ) Notice: Subject to any disclaimer, the term of this patent is extended or adjusted under 35 U.S.C. 154(b) by 271 days.

(21) Appl. No.: 17/089,835

(22) Filed: Nov. 5, 2020

(65) Prior Publication Data

US 2022/0134666 A1 May 5, 2022

(51) Int. Cl.
  B29C 64/35 (2017.01)
  B24C 1/08 (2006.01)
  B33Y 40/00 (2020.01)

(52) U.S. Cl.
  CPC .............. *B29C 64/35* (2017.08); *B24C 1/086* (2013.01); *B33Y 40/00* (2014.12)

(58) Field of Classification Search
  CPC ........... B24C 5/04; B24C 1/003; B24C 1/086; B29C 64/35; B22F 10/68; B05B 7/068
  See application file for complete search history.

(56) References Cited

U.S. PATENT DOCUMENTS

| | | | |
|---|---|---|---|
| 2,604,361 A | 7/1952 | Yates | |
| 3,424,386 A * | 1/1969 | Maasberg | B24C 5/04 366/178.2 |
| 3,940,061 A | 2/1976 | Gimple et al. | |
| 4,125,969 A * | 11/1978 | Easton | B24C 5/04 451/39 |
| 5,711,489 A | 1/1998 | Yanagida et al. | |
| 7,045,738 B1 | 5/2006 | Kovacevic et al. | |
| 7,178,744 B2 | 2/2007 | Tapphorn et al. | |
| 2011/0104991 A1* | 5/2011 | O'Donoghue | B24C 1/10 451/36 |
| 2015/0321217 A1 | 11/2015 | Nardi et al. | |
| 2017/0050254 A1 | 2/2017 | Holverson et al. | |
| 2019/0299362 A1* | 10/2019 | Palm | C22C 23/02 |
| 2020/0061653 A1* | 2/2020 | Wakelam | B22F 12/70 |
| 2020/0147691 A1* | 5/2020 | Joshi | B33Y 10/00 |
| 2021/0016392 A1* | 1/2021 | Fisher | B23K 26/34 |
| 2021/0046519 A1* | 2/2021 | Go | B33Y 40/20 |

FOREIGN PATENT DOCUMENTS

| | | | |
|---|---|---|---|
| CN | 104827408 A * | 8/2015 | |
| WO | WO8804220 * | 6/1988 | ........... B05B 7/1436 |
| WO | WO-2006034824 A2 * | 4/2006 | ........... B24C 1/003 |
| WO | 2018157148 A1 | 8/2018 | |
| WO | WO-2019206951 A1 * | 10/2019 | ........... B08B 9/093 |
| WO | WO-2020128500 A1 * | 6/2020 | ........... B22F 3/008 |
| WO | WO-2020201215 A1 * | 10/2020 | ........... B05B 7/064 |

* cited by examiner

Primary Examiner — Timothy Kennedy
Assistant Examiner — Ariella Machness
(74) Attorney, Agent, or Firm — Dinsmore & Shohl LLP

(57) ABSTRACT

A blast nozzle for a depowdering apparatus includes an abrasive material inlet fluidly connected to an abrasive material outlet and a fluid inlet fluidly connected to a fluid outlet, where the fluid outlet at least partially surrounds the abrasive material outlet. The fluid outlet is angled with respect to the abrasive material outlet and configured to emit a fluid stream directed to a focal point, the focal point being laterally spaced apart from the blast nozzle in a fluid flow direction.

12 Claims, 12 Drawing Sheets

BLAST NOZZLES FOR ADDITIVE MANUFACTURING AND METHODS FOR USING THE SAME

BACKGROUND

Field

The present specification generally relates to additive manufacturing, and more specifically, to blast nozzles for additive manufacturing and methods for using the same.

Technical Background

Additive manufacturing may be utilized to "build" an object (or "build part") from build material, such as organic or inorganic powders, in a layer-wise manner. Early iterations of additive manufacturing apparatuses were used for prototyping three-dimensional ("3D") objects. However, as additive manufacturing technology has improved, there is an increased interest in utilizing additive manufacturing for large-scale commercial production of objects.

The build part, when formed, may be disposed within a cake of excess build material that must be removed in order to complete the building process. The cake is conventionally removed in a depowdering apparatus that directs a blast stream including fluid and abrasive material onto the cake to remove the excess build material surrounding the build part. However, conventional blast nozzles intermix abrasive material with fluid within the blast nozzle, which can result in mechanical wear within the blast nozzle and contaminants from the blast nozzle material entering the blast stream.

Accordingly, a need exists for alternative blast nozzles and components thereof.

SUMMARY

In embodiments, a blast nozzle for a depowdering apparatus includes an abrasive material inlet fluidly connected to an abrasive material outlet and a fluid inlet fluidly connected to a fluid outlet, where the fluid outlet at least partially surrounds the abrasive material outlet. The fluid outlet is angled with respect to the abrasive material outlet and configured to emit a fluid stream directed to a focal point, the focal point being laterally spaced apart from the blast nozzle in a fluid flow direction.

In embodiments, a depowdering apparatus includes a depowdering chamber and a blast nozzle. The depowdering chamber includes a bottom surface and a build inlet extending through the bottom surface. The build inlet includes an inlet axis that is substantially vertically oriented. The blast nozzle includes an abrasive material inlet fluidly connected to an abrasive material outlet and a fluid inlet fluidly connected to a fluid outlet. The fluid outlet at least partially surrounds and is angled with respect to the abrasive material outlet and is configured to emit a fluid stream directed to a focal point. The focal point is laterally spaced apart from the blast nozzle in a fluid flow direction. The blast nozzle is positioned within the depowdering chamber, laterally spaced apart from the inlet axis, and oriented to direct a blast stream toward the inlet axis.

In embodiments, a method for depowdering a cake including a build part includes positioning the cake comprising the build part on a build elevator and elevating the cake with the build elevator through a build inlet extending through a bottom surface of a depowdering chamber and along an inlet axis that is substantially vertically oriented. The method further includes positioning a blast nozzle within the depowdering chamber, where the blast nozzle includes an abrasive material inlet fluidly connected to an abrasive material outlet and a fluid inlet fluidly connected to a fluid outlet. The fluid outlet at least partially surrounds and is angled with respect to the abrasive material outlet and is configured to emit a fluid stream directed to a focal point. The focal point is laterally spaced apart from the blast nozzle in a fluid flow direction, and the blast nozzle is laterally spaced apart from the inlet axis. The method further includes projecting a blast stream from the blast nozzle toward the cake comprising the build part, where the blast stream removes powder material from the cake thereby exposing the build part.

Additional features and advantages of the blast nozzles described herein, the components thereof, and methods of using the same will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
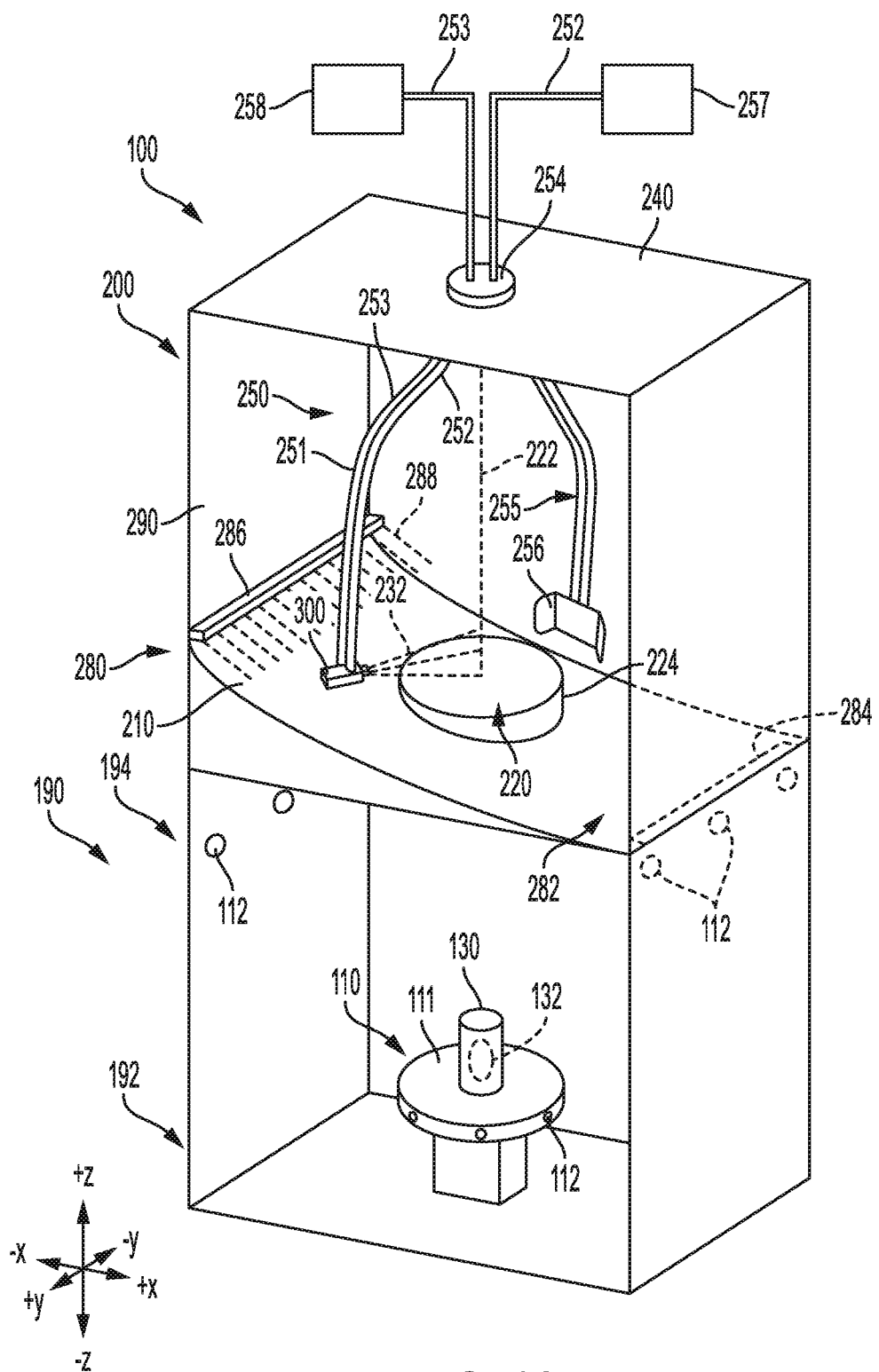
FIG. 1A schematically depicts a depowdering apparatus including a depowdering chamber for depowdering a cake according to one or more embodiments shown and described herein.

Reference will now be made in detail to embodiments of blast nozzles for depowdering apparatuses, examples of which are illustrated in the accompanying drawings, and methods of using the same. Whenever possible, the same reference numerals will be used throughout the drawings to refer to the same or like parts. Various embodiments of blast nozzles for depowdering apparatuses, components thereof, and methods of using the same will be described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom, above, below—are made only with reference to the figures as drawn and are not intended to imply absolute orientation unless otherwise specified or apparent from the description.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

In additive manufacturing processes the build part, when formed, may be disposed within a cake of excess build material that must be removed in order to complete the building process. The cake is conventionally removed by a blast nozzle in a depowdering apparatus, where fluid, abrasive material, or both are directed onto the cake by the blast nozzle to remove the excess build material surrounding the build part. However, conventional blast nozzles mix abrasive material with the fluid stream inside of the blast nozzle, which results in in contaminants from the blast nozzle material entering the blast stream.

Figure 2:
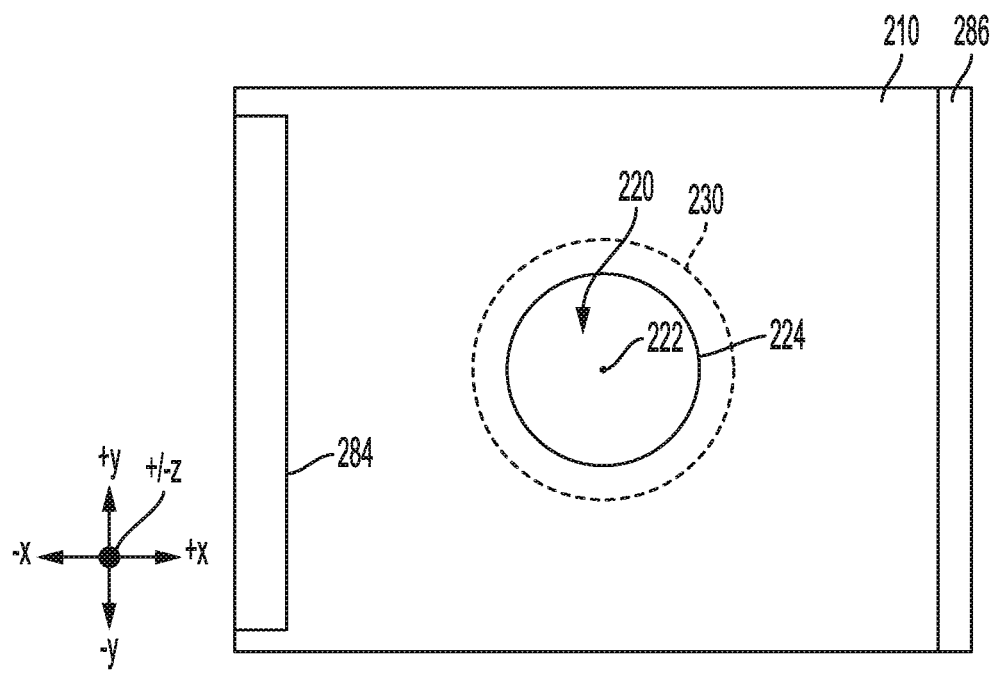
FIG. 2 schematically depicts a top-down view of a depowdering chamber for use with a depowdering apparatus according to one or more embodiments shown and described herein.

In the embodiments described herein, to address such concerns, the blast nozzles 300 include a fluid outlet that at least partially surrounds an abrasive material outlet, such that the abrasive material is not mixed within the fluid stream inside of the blast nozzle, but rather is mixed within the fluid stream outside of the blast nozzle, resulting in less blast nozzle wear over time and less contaminants within the blast stream. In embodiments, the blast nozzle 300 may be used in any conventional depowdering apparatus. Although the figures of the present disclosure may refer specifically to the depowdering apparatus 100, it should be understood that the blast nozzle 300 may be used in any depowdering apparatus known in the art. Referring now to FIGS. 1A and 2, the depowdering apparatus 100 described herein may comprise a depowdering chamber 200 having the blast nozzle 300 positioned within the depowdering chamber 200. The depowdering chamber 200 may further comprise a bottom surface 210 which includes a build inlet 220 extending therethrough and through which a cake 130 comprising a build part 132 may be introduced into the depowdering chamber 200 from below the depowdering chamber 200. The build inlet 220 comprises an inlet axis 222 which, in the embodiments described herein, is substantially vertically oriented (e.g., in the +/−Z direction in FIGS. 1A and 2). The cake 130 comprising the build part 132 is raised into the depowdering chamber 200 through the build inlet 220 along the inlet axis 222. To facilitate raising the cake 130 through the build inlet 220, the depowdering apparatus 100 may further comprise a build elevator 110 arranged below the build inlet 220 in the vertical direction. Accordingly, it should be understood that the build elevator 110 is operable to raise the cake 130 comprising the build part 132 through the build inlet 220 and into the depowdering chamber 200 along the inlet axis 222.

Still referring to FIGS. 1A and 2, the blast nozzle 300 is laterally spaced from the inlet axis 222. That is, the blast nozzle 300 is spaced apart from the inlet axis 222 in the XY plane of the coordinate axes depicted in the figures. In embodiments, the blast nozzle 300 is also laterally spaced from a perimeter 224 of the build inlet 220. In the embodiments described herein, the blast nozzle 300 is operable to revolve about the inlet axis 222 on a travel path 230 encircling the inlet axis 222, as shown in FIG. 2. In embodiments, the travel path 230 of the blast nozzle 300 is arranged within the depowdering chamber 200 such that the blast nozzle 300 revolves about the inlet axis 222 and the perimeter 224 of the build inlet 220. Revolution of the blast nozzle 300 may be synchronized with introduction of the cake 130 into the depowdering chamber 200 such that excess powder is removed from the cake 130 as the cake 130 is introduced into the depowdering chamber 200. This may increase the speed of the depowdering operation and reduce manual labor, thereby increasing efficiency and manufacturing throughput.

In the embodiments described herein, the blast nozzle 300 is oriented in the depowdering chamber 200 to direct a blast stream 232 toward the inlet axis 222, thereby facilitating depowdering of a cake 130 comprising a build part 132 as the cake 130 is introduced into the depowdering chamber 200 along the inlet axis 222. That is, the blast nozzle 300 is oriented to direct a blast stream 232 toward the inlet axis 222 as the blast nozzle 300 revolves about the inlet axis 222 on the travel path 230, thereby facilitating depowdering of a cake 130 comprising a build part 132 as the cake 130 is raised through the build inlet 220 and into the depowdering chamber 200 with the build elevator 110.

In embodiments, to facilitate revolution of the blast nozzle 300 about the inlet axis 222, the blast nozzle 300 may be rotatably coupled to a top surface 240 of the depowdering chamber 200 with an arm assembly 250. The arm assembly 250 may include a first revolvable arm 251 and a revolution actuator 254, such as a motor or the like, that rotatably couples the first revolvable arm 251 to the top surface 240 of the depowdering chamber 200. The first revolvable arm 251 is operable to revolve the blast nozzle 300 about the inlet axis 222 on the travel path 230 by actuation of the revolution actuator 254. The first revolvable arm 251 is configured such that the blast nozzle 300 is laterally spaced from the inlet axis 222 of the build inlet 220 (or laterally spaced from the inlet axis 222 and the perimeter 224 of the build inlet 220), as noted herein. In embodiments, the first revolvable arm 251 may include a fluid conduit 252 and an abrasive material conduit 253 which are fluidly coupled to the blast nozzle 300 to supply fluid and abrasive material, respectively, to the blast nozzle 300. In embodiments, the revolution actuator 254 may further include a rotating union through which the fluid conduit 252 and abrasive material conduit 253 are coupled to the blast nozzle 300 to prevent twisting of the fluid conduit 252 and the abrasive material conduit 253 when the arm assembly 250 rotates.

Referring to FIG. 1A, the fluid conduit 252 of the first revolvable arm 251 is fluidly coupled to a fluid source 257 and the abrasive material conduit 253 of the first revolvable arm 251 is fluidly coupled to an abrasive material source 258. In embodiments, the fluid source 257 may include an air source, such as a compressed air source, which provides air to the blast nozzle 300 through the fluid conduit 252. The abrasive material source 258 may include abrasive material comprising organic or inorganic powder that is delivered to the blast nozzle 300 through the abrasive material conduit 253. In embodiments, the inorganic powder may include metal alloy powder, such as stainless steel powder, cobalt alloy powder, copper alloy powder, diamond catalyst alloy powder, nickel alloy powder, or combinations thereof. The abrasive material may have a particle size of from 0 to 250 µm, from 10 to 250 µm, from 30 to 250 µm, from 50 to 250 µm, from 100 to 250 µm, from 150 to 250 µm, from 200 to 250 µm, from 0 to 200 µm, from 10 to 200 µm, from 30 to 200 µm, from 50 to 200 µm, from 100 to 200 µm, from 150 to 200 µm, from 0 to 150 µm, from 10 to 150 µm, from 30 to 150 µm, from 50 to 150 µm, from 100 to 150 µm, from 0 to 100 µm, from 10 to 100 µm, from 30 to 100 µm, from 50 to 100 µm, from 0 to 50 µm, from 10 to 50 µm, from 30 to 50 µm, from 0 to 30 µm, from 10 to 30 µm, or from 0 to 10 µm. In embodiments, the abrasive material may be substantially similar to or the same as the build material of the cake 130 and the build part 132.

In embodiments, the blast nozzle 300 and the first revolvable arm 251 may be constructed of, for example and without limitation, a metal or a metallic alloy. However, it should be understood that other materials for the blast nozzle 300 and the first revolvable arm 251 are contemplated and possible, such as polymers, ceramics, and/or combinations thereof. In embodiments, the blast nozzle 300 may be constructed of a material similar to or the same as the abrasive material, the build material, or both, to avoid contamination of the powder removed from the cake 130.

Figure 1B:
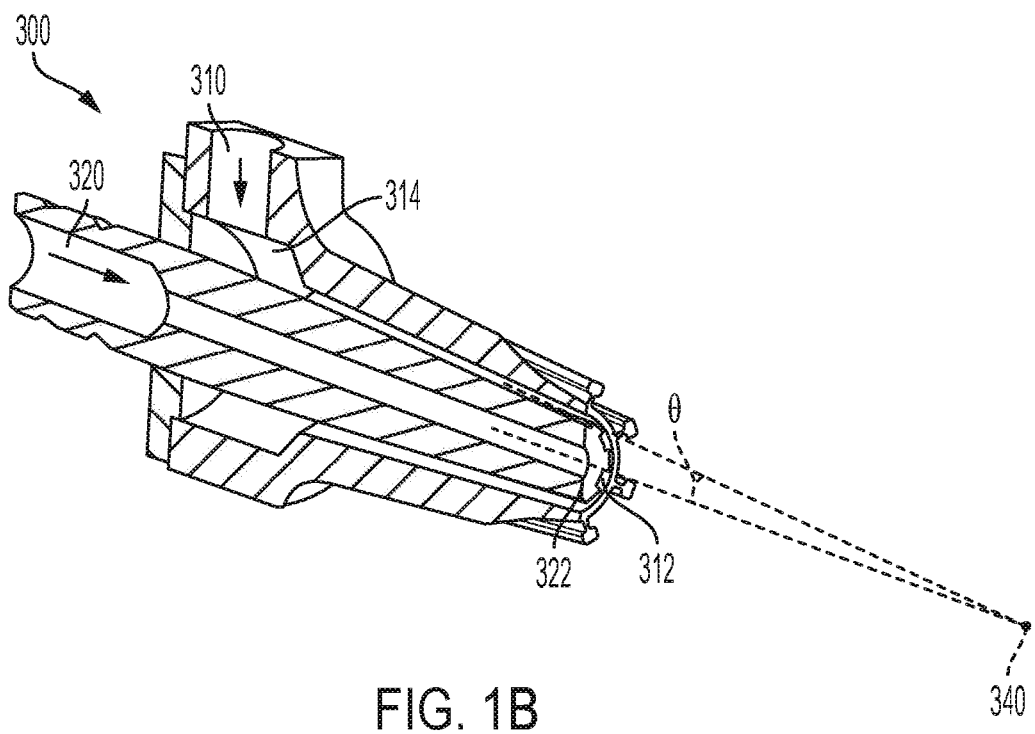
FIG. 1B schematically depicts a cross section of a nozzle for use with a depowdering apparatus according to one or more embodiments shown and described herein.
Figure 1C:
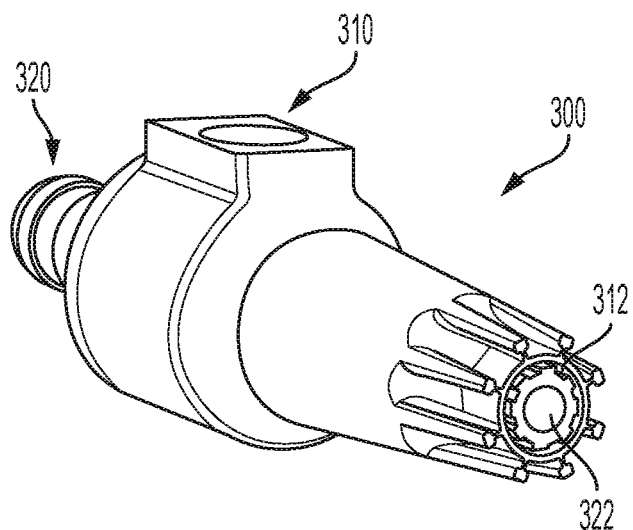
FIG. 1C schematically depicts a nozzle for use with a depowdering apparatus according to one or more embodiments shown and described herein.
Figure 1D:
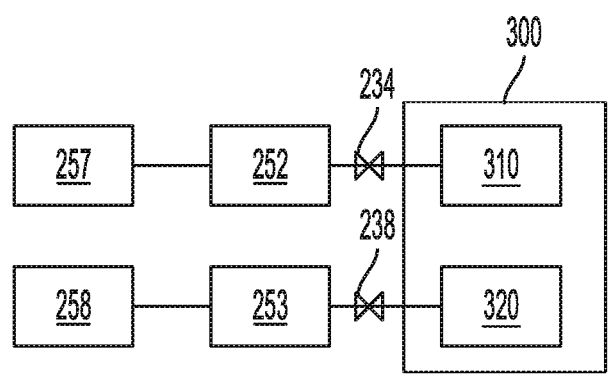
FIG. 1D depicts a block diagram of a nozzle system for use with a depowdering apparatus according to one or more embodiments shown and described herein.

Referring now to FIGS. 1B-1D, in embodiments, the blast nozzle 300 comprises an abrasive material inlet 320 fluidly connected to an abrasive material outlet 322, and a fluid inlet 310 fluidly connected to a fluid outlet 312. In embodiments, the fluid inlet 310 is fluidly connected to the fluid source 257 through the fluid conduit 252, and the abrasive material inlet 320 is fluidly connected to the abrasive material source 258 through the abrasive material conduit 253.

As shown in FIG. 1D, a fluid control valve 234 may be fluidly coupled to the fluid conduit 252, to regulate the flow of the fluid from the fluid source 257 to the blast nozzle 300. When included, the fluid control valve 234 may be positioned between the fluid conduit 252 and the fluid inlet 310, although other positions are possible and contemplated, such as between the fluid source 257 and the fluid conduit 252. In embodiments, the fluid control valve 234 may comprise a pneumatic shut off valve or another type of pinch valve. In the embodiments described herein, the fluid control valve 234 may be utilized to vary the pressure of the blast stream 232 emitted from the blast nozzle 300.

In embodiments, an abrasive material source valve 238 may be fluidly coupled to the abrasive material conduit 253, to regulate the flow of the abrasive material from the abrasive material source 258 to the blast nozzle 300. When included, the abrasive material source valve 238 may be positioned between the abrasive material conduit 253 and the abrasive material inlet 320, although other positions are possible and contemplated, such as between the abrasive material source 258 and the abrasive material conduit 253. In embodiments, the abrasive material source valve 238 may comprise a pneumatic shut off valve or another type of pinch valve. The abrasive material source valve 238 may be utilized to vary the amount of abrasive material entrained in the blast stream 232 emitted from the blast nozzle 300.

In embodiments, the abrasive material may be prevented from mixing with the fluid by closing the abrasive material source valve 238. As such, when the abrasive material source valve 238 is closed, the blast nozzle 300 may direct a fluid stream that comprises only the fluid from the fluid source 257, and when the abrasive material source valve 238 is open, the blast nozzle 300 may direct the blast stream 232 that comprises abrasive material entrained in the fluid stream. In embodiments, the blast nozzle 300 may direct the fluid stream that comprises only the fluid from the fluid source 257 to remove any remaining abrasive material from the build part 132, thereby cleaning the build part 132.

Referring again to FIGS. 1B and 1C, in embodiments, the fluid outlet 312 may at least partially surround the abrasive material outlet 322. The phrase "at least partially surround," as used herein, means that the fluid outlet 312 bounds the abrasive material outlet 322 on at least one side. For example, the fluid outlet 312 bounds the circumference of the abrasive material outlet 322 in the embodiment depicted in FIGS. 1B and 1C. In this particular embodiment, the fluid outlet 312 bounds the entire circumference of the abrasive material outlet 322. In embodiments (not depicted), the fluid outlet 312 may bound three quarters, half, or one quarter of the circumference of the abrasive material outlet 322. Other degrees of bounding (e.g., less than one quarter of the circumference, greater than one quarter and less than one half of the circumference, greater than three quarters and less than the entire circumference, etc.) are possible and contemplated. Additionally or alternatively, the fluid outlet 312 may continuously bound the abrasive material outlet 322, or may be interrupted and partitioned around the circumference of the abrasive material outlet 322. In embodiments, the blast nozzle 300 may further include a fluid channel 314 fluidly connecting the fluid inlet 310 to the fluid outlet 312. In embodiments, the fluid channel 314 may at least partially surround the abrasive material inlet 320.

As shown in FIGS. 1B and 1C, the fluid outlet 312 is angled with respect to the abrasive material outlet 322 and configured to emit a fluid stream directed to a focal point 340. In various embodiments, the focal point 340 is laterally spaced apart from the blast nozzle 300 in a fluid flow direction, as shown in FIG. 1B. The fluid outlet 312 is angled with respect to the abrasive material outlet 322 forming an angle θ, as shown in FIG. 1B. The angle θ may be from 5° to 45°, from 5° to 35°, from 5° to 30°, from 5° to 25°, from 5° to 20°, from 5° to 15°, from 5° to 10°, or any combination thereof. Without intending to be bound by theory, it is contemplated that when the angle θ is greater than 45°, the suction of the blast media may be reduced and the focal point 340 will be too close to the blast nozzle 300, thereby creating a wide and unfocused blast stream 232.

Similarly, the abrasive material outlet 322 is configured to emit an abrasive material stream directed to the focal point 340. In embodiments, the abrasive material stream and the fluid stream intermix at the focal point 340 and form the blast stream 232. The focal point 340 may be from 50 millimeters (mm) to 300 mm from the abrasive material outlet 322. In embodiments, the focal point may be from 50 mm to 200 mm, from 50 mm to 175 mm, from 50 mm to 150 mm, from 50 mm to 125 mm, from 50 mm to 100 mm, from 75 mm to 300 mm, from 75 mm to 200 mm, from 75 mm to 175 mm, from 75 mm to 150 mm, from 75 mm to 125 mm, from 75 mm to 100 mm, from 100 mm to 300 mm, from 100 mm to 200 mm, from 100 mm to 175 mm, from 100 mm to 150 mm, from 100 mm to 125 mm, from 125 mm to 300 mm, from 125 mm to 200 mm, from 125 mm to 175 mm, from 125 mm to 150 mm, from 150 mm to 300 mm, from 150 mm to 200 mm, or from 150 mm to 175 mm from the abrasive material outlet 322. Without intending to be bound by theory, it is believed that if the focal point 340 is greater than 300 mm from the abrasive material outlet 322, the fluid stream will not create suction at the abrasive material outlet 322 sufficient to intermix the abrasive material with the fluid stream to form the blast stream 232.

As stated above, the fluid stream creates suction at the abrasive material outlet 322 due to the fluid outlet 312 being angled with respect to the abrasive material outlet 322. Specifically, the abrasive material at the abrasive material outlet 322 may be subject to a pressure drop from a Venturi effect when the fluid stream exits the fluid channel 314 at the fluid outlet 312. The resultant pressure drop causes abrasive material to be sucked to the focal point 341 and entrained in the fluid stream which then forms blast stream 232 (FIG. 1A).

The Venturi effect is a phenomenon where a pressure of a fluid reduces as fluid flows through a constricted section of a pipe (such as the fluid channel 314). The fluid pressure decreases because a velocity of the fluid must increase as the fluid flows through a constricted section (in accordance with the principle of mass continuity), while a static pressure of the fluid must decrease (in accordance with the principle of conservation of mechanical energy, known as Bernoulli's principle). Therefore, any increase in a kinetic energy of the fluid as it passes through the fluid channel 314 is balanced by a pressure drop. The theoretical pressure drop at the fluid channel 314 is represented by Equation 1.

$$\Delta p = \frac{\rho}{2}(v_2^2 - v_1^2) \qquad \text{Equation 1}$$

where $\Delta p$ is the pressure drop, $\rho$ is the density of the fluid, $v_1$ is the slower velocity of the fluid (i.e., the velocity of the fluid within the fluid inlet 310 prior to entering fluid channel 314), and $v_2$ is the faster velocity of the fluid (i.e., the velocity of the fluid within fluid channel 314 exiting the fluid outlet 312).

More specifically, in embodiments, a pressure of the abrasive material flowing from the abrasive material inlet 320 to the abrasive material outlet 322 is greater than the pressure of the fluid stream exiting through the fluid outlet 312 of the blast nozzle 300. As a result, the abrasive material is sucked to the focal point 341 due to the pressure drop described above when the fluid stream exits through the fluid outlet 312 of the blast nozzle 300. Additionally, when the fluid stream exits the fluid channel 314 and flows towards the focal point 340, the fluid pressure increases as the fluid velocity decreases, and the flow of the fluid may become turbulent, thereby mixing the fluid with the abrasive material and causing the abrasive material to become entrained in the blast stream 232.

In the embodiments described herein, the fluid outlet 312 at least partially surrounds the abrasive material outlet 322 and the fluid outlet 312 is angled with respect to the abrasive material outlet 322, as previously described. It is contemplated that having the fluid outlet 312 at least partially surround the abrasive material outlet 322 will reduce contamination that may happen when the abrasive material is introduced into the blast nozzle 300. In particular, because the abrasive material is not mixed within the fluid stream inside of the blast nozzle (as in conventional blast nozzles), it is contemplated that less wear may occur over time and less contaminants will be present in the blast stream 232. Specifically, as the interior of the blast nozzle is worn down due to the abrasive material mixing inside and causing mechanical wear, the material of the blast nozzle may break down and contaminate the blast stream 232. Accordingly, the blast nozzles 300 described herein may have decreased contaminants in the stream 232 because the abrasive material intermixes with the fluid stream at the focal point 340, which is laterally spaced apart from the blast nozzle 300 in a fluid flow direction, as shown in FIG. 1B.

Figure 3:
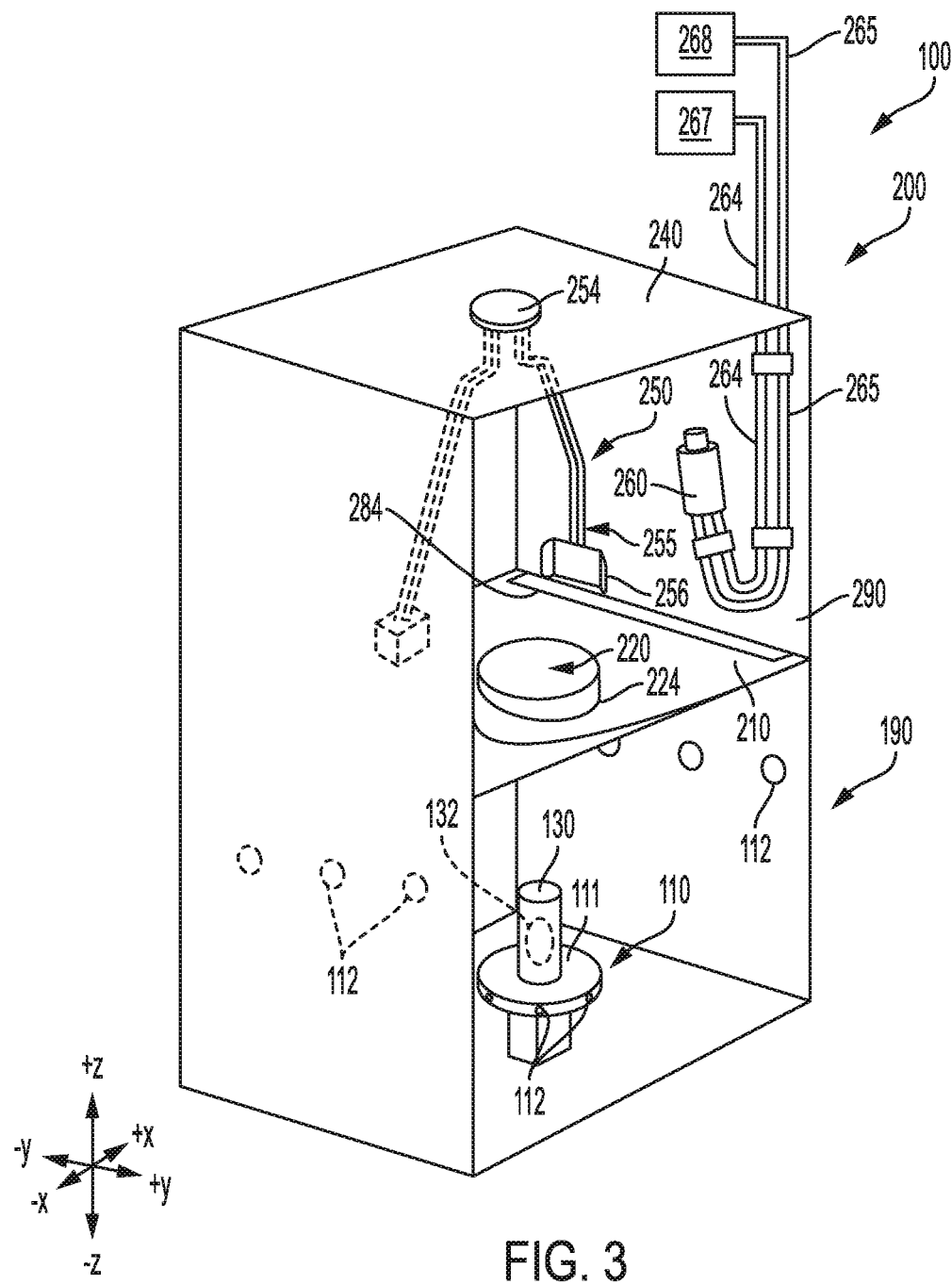
FIG. 3 schematically depicts a cross section of a depowdering apparatus including a depowdering chamber for depowdering a cake according to one or more embodiments shown and described herein.

Referring now to FIGS. 1A and 3, in embodiments, the arm assembly 250 may further include a second revolvable arm 255 laterally spaced from the first revolvable arm 251 in the XY plane of the coordinate axes depicted in the figures. In embodiments, the first revolvable arm 251 and the second revolvable arm 255 are spaced apart from one another along a diameter of the build inlet 220. A blast shield 256 may be coupled to the second revolvable arm 255, such that the blast shield may be revolved about the inlet axis 222 (or about the inlet axis 222 and the perimeter 224 of the build inlet 220) on the travel path 230 (FIG. 2) with the revolution actuator 254 of the arm assembly 250. In embodiments, the blast shield 256 may be arranged on the second revolvable arm 255 such that the blast stream 232 from the blast nozzle 300 is directed towards the blast shield 256 as the blast shield 256 is revolved about the inlet axis 222 on the travel path 230. In embodiments, the blast shield 256 may have a concave profile relative to the inlet axis 222, and may be formed from the same material as the abrasive material described herein.

In embodiments which include a blast shield 256, the blast shield 256 may block at least a portion of the blast stream 232 from impinging on a sidewall 290 of the depowdering chamber 200 and eroding the sidewall 290. This may reduce damage to the depowdering apparatus 100 and prevent contamination of powder removed from the cake 130 comprising the build part 132. In embodiments, the blast shield 256 may block at least a portion of the blast stream 232 from impinging on the sidewall 290 of the depowdering chamber 200 and redirect the blast stream 232 toward a bottom surface 210 of the depowdering chamber 200. In embodiments, the sidewall 290 may at least partially enclose the depowdering chamber 200. The phrase "at least partially enclose," as used herein, means that the sidewall 290 bounds the depowdering chamber 200 on at least one side. For example, the sidewall 290 bounds at least the vertical sides of the depowdering chamber 200 (i.e., the sides of the depowdering chamber 200 extending in the +/−Z direction of the coordinate axes depicted in the figures) in the embodiment depicted in FIG. 1A. In this embodiment, the sidewall 290 may be, for example, rectangular or square in horizontal cross section enclosing the depowdering chamber 200. In embodiments (not depicted), the sidewall 290 may form a cylinder, a half cylinder, or a quarter cylinder in horizontal cross section (i.e., a cross section defined by the X-Y plane in the coordinate axes depicted in the figures) partially enclosing the depowdering chamber 200.

Referring again to FIG. 1A, in embodiments, the bottom surface 210 of the depowdering chamber 200 may be arranged to promote the collection of powder material removed from the cake 130 comprising the build part 132 as well as abrasive material entrained in the blast stream 232 emitted from the blast nozzle 300. For example, in embodiments, the bottom surface 210 of the depowdering chamber 200 may be downwardly sloped from an elevated side 280 of the bottom surface to a recovery side 282 of the bottom surface 210 such that powder material removed from the cake 130 and abrasive material from the blast stream 232 collects on the recovery side 282 of the bottom surface 210 due to gravity.

In embodiments, the bottom surface 210 of the depowdering chamber 200 further comprises a powder recovery outlet 284 located on the recovery side 282 of the bottom surface. The powder recovery outlet 284 may be utilized to remove powder material removed from the cake 130 and abrasive material from the blast stream 232 from the depowdering chamber 200. For example, in embodiments, the powder recovery outlet 284 may be fluidly coupled to a vacuum source (not depicted) such that powder material removed from the cake 130 and abrasive material from the blast stream 232 is suctioned from the depowdering chamber 200 through the powder recovery outlet 284 and collected for reuse, either as abrasive material and/or as build material for use in a subsequent additive manufacturing operation.

In embodiments, the depowdering chamber 200 may further include an air knife 286 laterally positioned on the sidewall 290 and fluidly coupled to the fluid source 257. In embodiments, the air knife 286 may be positioned on the sidewall 290 above the elevated side 280 of the bottom surface 210 and oriented to direct an air curtain 288 toward the bottom surface 210 of the depowdering chamber 200. The air curtain 288 directed from the air knife 286 encourages powder removed from the cake 130 and abrasive material from the blast stream 232 to collect on the recovery side 282 for subsequent removal through the powder recovery outlet 284.

Figure 1E:
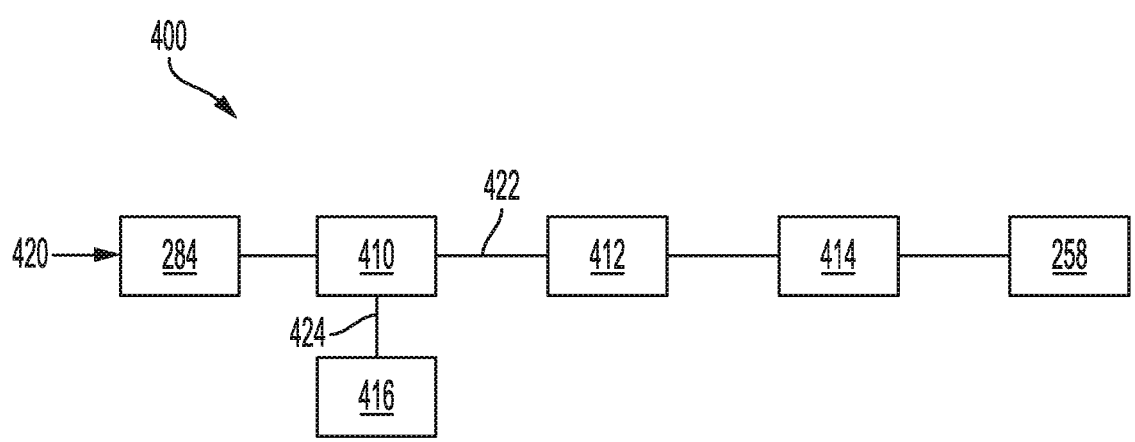
FIG. 1E depicts a block diagram of an abrasive material recycling system for use with a depowdering apparatus according to one or more embodiments shown and described herein.

Referring to FIGS. 1A and 1E, in embodiments, powder material removed from the cake 130 and abrasive material from the blast stream 232 (collectively, powder material 420) may be recycled for further use, as noted herein. A block diagram of the recycling process 400 is schematically depicted in FIG. 1E. As depicted in FIG. 1E, powder material 420 flows into and through the powder recovery outlet 284 by vacuum suction, where the powder recovery outlet 284 is coupled to a vacuum source. The powder material 420 is then directed into a cyclone separator 410, where the powder material 420 is separated by size and weight. In embodiments, the larger (and therefore heavier) particles 422 pass through the cyclone separator 410 to a magnetic separator 412, which may remove magnetic particles from the larger particles 422. The larger particles 422 then pass to intermediate storage 414, and then are added to the abrasive material source 258. The smaller (and, therefore, lighter) particles 424 are sent to a fine filter 416. The material collected in the abrasive material source 258 may be recycled for use as abrasive material for the blast nozzle 300 while smaller particles 424 may be recycled for use in a subsequent additive manufacturing operation (i.e., as build material for forming a build part 132 and/or cake 130).

Figure 5:
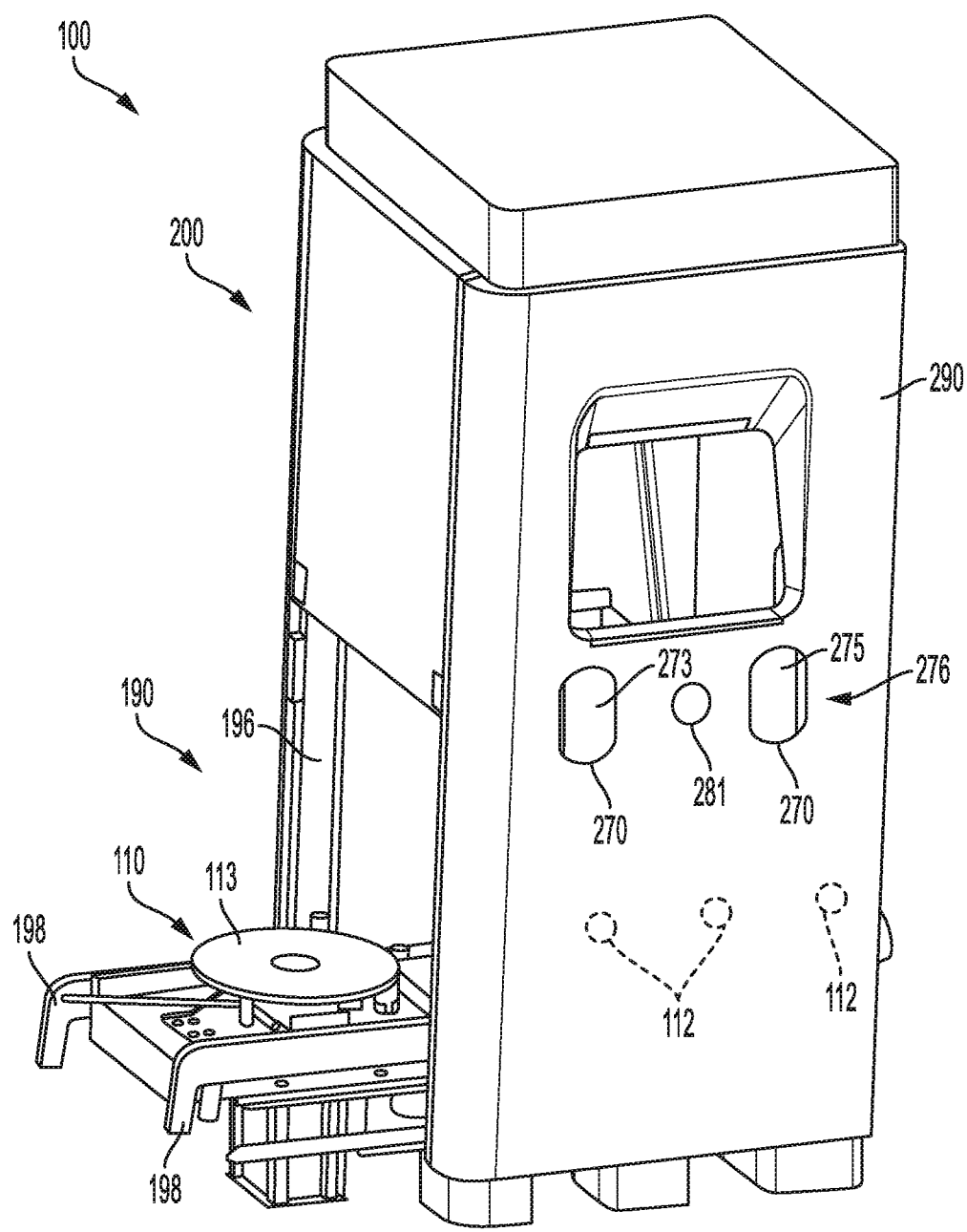
FIG. 5 schematically depicts a perspective view of a depowdering apparatus according to one or more embodiments shown and described herein.
Figure 6:
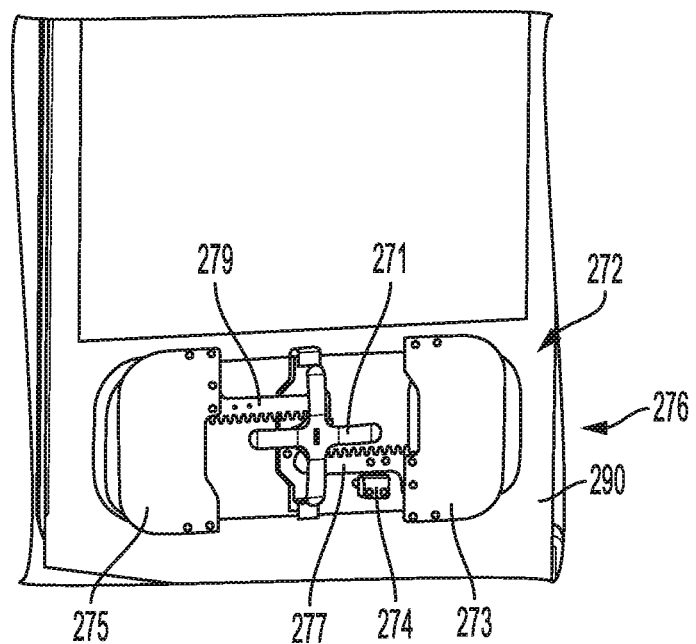
FIG. 6 schematically depicts an internal view of a portion of a sidewall of a depowdering chamber of the depowdering apparatus of FIG. 5 according to one or more embodiments shown and described herein.
Figure 7:
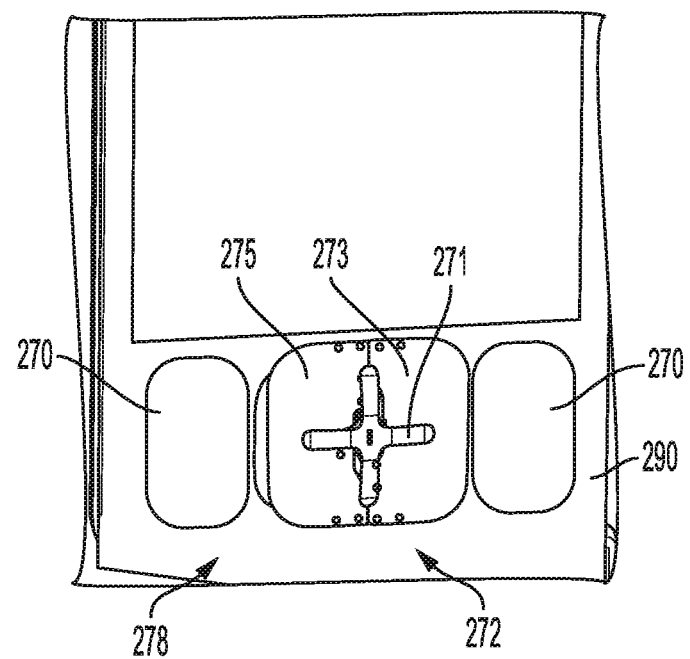
FIG. 7 schematically depicts an internal view of a portion of a sidewall of a depowdering chamber of the depowdering apparatus of FIG. 5 according to one or more embodiments shown and described herein.

Referring now to FIGS. 5-7, in embodiments, the depowdering chamber 200 may further include an access port 270 extending through the sidewall 290, a door assembly 272, and a door sensor 274. The access port 270 may include a single access port (not depicted), two access ports 270 (as depicted in the figures), or more than two access ports. In embodiments, the access port(s) 270 may comprise glove inserts (not shown) to allow an operator to insert his/her hands into the depowdering chamber 200 to perform manual operations. The door assembly 272 is movable between a closed position 276 relative to the access port(s) 270 (as depicted in FIGS. 5 and 6) and an open position 278 relative to the access port(s) 270 (as depicted in FIG. 7). The door assembly 272 seals the access port(s) 270 when the door assembly 272 is in the closed position 276, and does not seal the access port(s) 270 when the door assembly 272 is in the open position 278, thereby allowing access to the depowdering chamber 200 through the access port(s) 270.

The door assembly 272 may include a number of panels. For example and without limitation, the door assembly 272 may include a single panel (not depicted), two panels 273, 275 (as depicted), or more than two panels. As a specific example, in embodiments in which the depowdering chamber 200 includes a single access port 270, the door assembly 272 may include one panel to seal the single access port. Alternatively, in embodiments where the access port 270 includes two access ports 270 (as depicted), the door assembly 272 may include one panel, two panels 273, 275, or more than two panels. The door assembly 272 may use one panel to seal the two access ports 270, where the one panel comprises an area large enough to prohibit access through both access ports (not shown). In embodiments in which the access port 270 includes two panels, as shown in FIGS. 5-7, the door assembly 272 includes a first panel 273 and a second panel 275. In this embodiment, the door assembly 272 may comprise a rack and pinion connection as shown, where the first panel 273 is mechanically coupled to a first rack 277, and the second panel 275 is mechanically coupled to a second rack 279. The first rack 277 and the second rack 279 are positioned on opposite sides of and engaged with a pinion 271. Rotation of the pinion 271 (such as with knob 281 (FIG. 5) coupled to pinion 271) displaces the first panel 273 and the second panel 275 relative to one another, thereby moving the door assembly 272 either from the closed position 276 to the open position 278 or from the open position 278 to the closed position 276.

In embodiments, the door sensor 274 is operatively associated with the door assembly 272 and configured to detect whether the door assembly 272 is in the closed position 276 or not in the closed position. In other embodiments, the door sensor 274 detects whether the door assembly 272 is in the closed position or in the open position 278. The door sensor 274 is operable to emit a signal indicating that the door assembly 272 is in the closed position 276 or not in the closed position 276. The door sensor 274 may be, for example and without limitation, a magnetic switch, a proximity switch, a reed switch, a limit switch, a photoelectric switch or the like. For example and without limitation, in embodiments the door sensor may be an MN202S magnetically coded sensor available from Ifm Efector, Inc. of Malvern, PA The door sensor 274 may be used to prevent or discontinue operation of the depowdering apparatus when the door assembly 272 is not in the closed position 276. For example and without limitation, the door sensor 274 may be used to prevent or discontinue operation of the blast nozzle 300 and/or the arm assembly 250 when the door assembly 272 is not in the closed position 276.

As referenced previously, the depowdering apparatus 100 further comprises a build elevator 110 arranged below the build inlet 220 in a vertical direction. Referring now to FIG. 5, the build elevator 110 may comprise an elevator stage 113. In embodiments, the build elevator 110 comprises a telescoping actuator, such as the TL3 lifting column available from TiMotion Technology Co. Ltd. of New Taipei City, Taiwan. In embodiments in which the build elevator 110 comprises a telescoping actuator, the telescoping actuator may aid in decreasing the overall height of the depowdering apparatus 100 such that the depowdering chamber 200 may be positioned closer to the ground, eliminating the need for the use of stairs and/or platforms to facilitate access to the depowdering chamber 200 by a user.

While the build elevator has been described herein as comprising a telescoping actuator, it should be understood that other embodiments are contemplated and possible. For example, in an alternative embodiment (not depicted), the build elevator 110 comprises a ball screw coupled to a motor with a drive linkage rotatably coupling the ball screw to the armature of the motor. In this embodiment, rotation of the motor rotates the ball screw, thereby raising or lowering the build elevator 110. However, it should be understood that other embodiments are contemplated and possible.

Figure 9A:
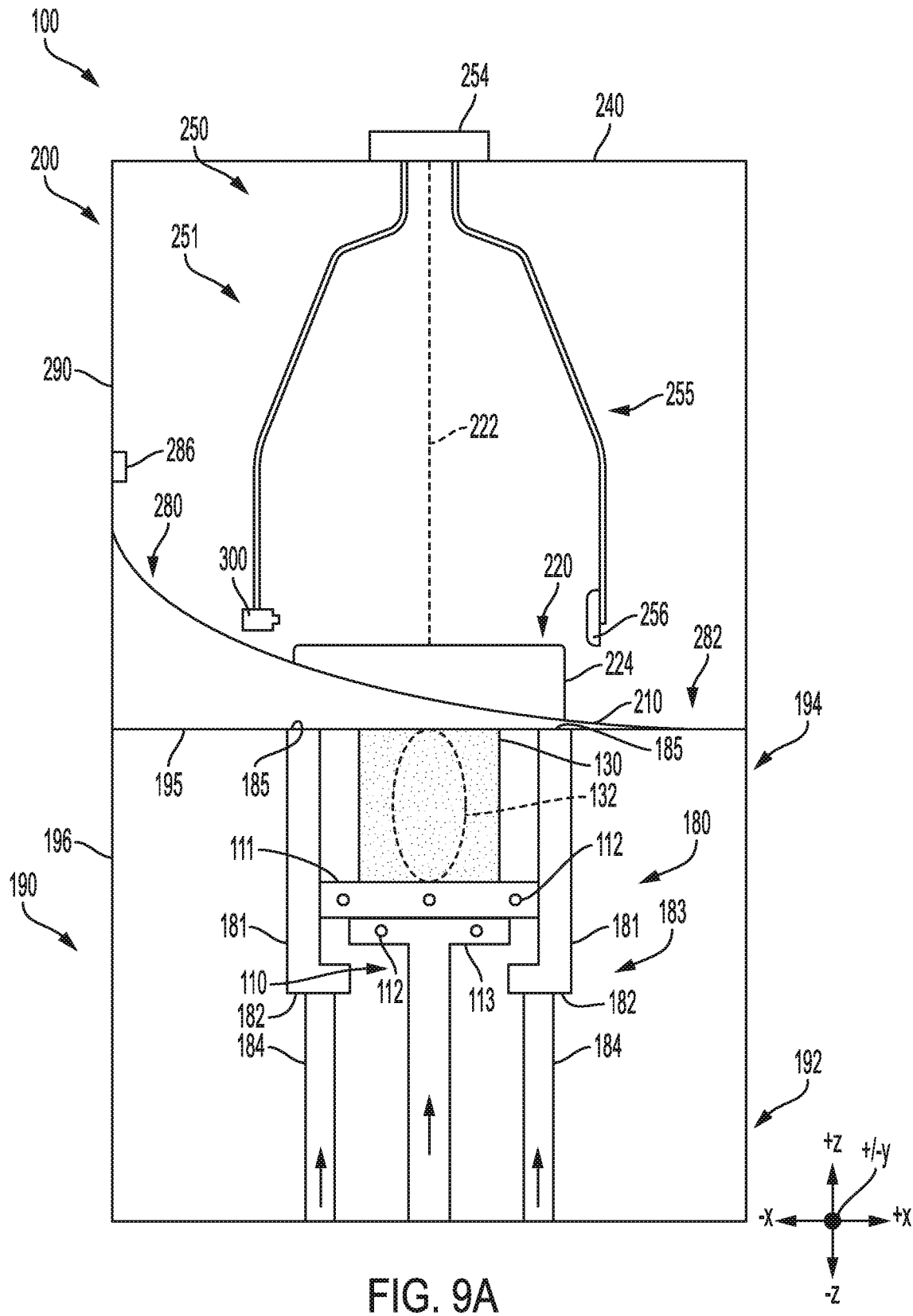
FIG. 9A schematically depicts the depowdering apparatus of FIG. 1A in use according to one or more embodiments shown and described herein.
Figure 9B:
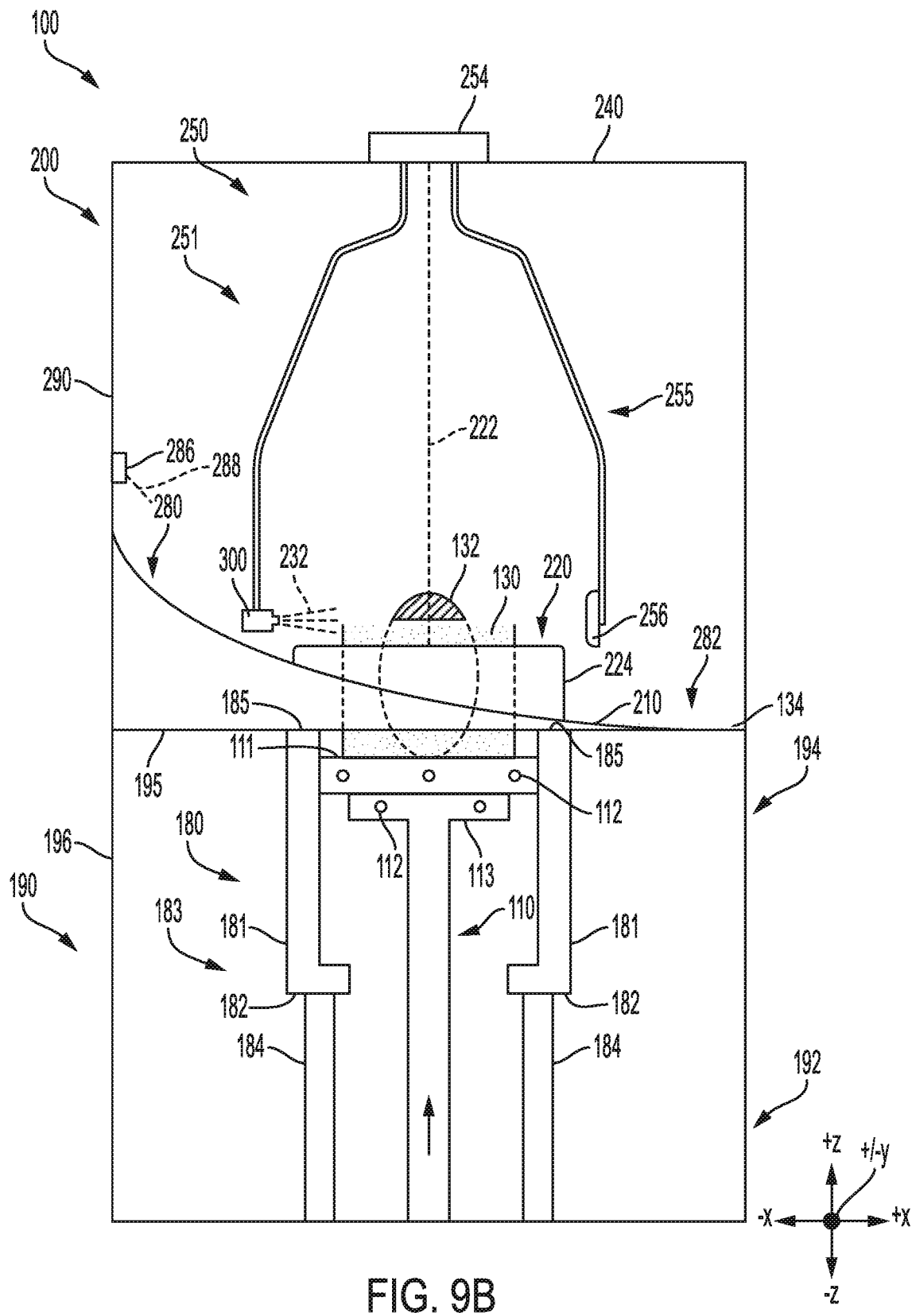
FIG. 9B schematically depicts the depowdering apparatus of FIG. 1A in use according to one or more embodiments shown and described herein.

Referring to FIGS. 1A, 3, 5, 9A, and 9B, in embodiments, the depowdering apparatus 100 comprises a build tank chamber 190 positioned below the depowdering chamber 200 in the vertical direction (i.e., the +/−Z direction in the FIGS.). The build tank chamber 190 is configured to receive a build tank 180 (shown in FIGS. 9A and 9B) in which the cake 130 comprising a build part 132 is disposed. Referring to FIGS. 9A and 9B, in embodiments, the build tank 180 includes a housing 181 comprising a platform 111 on which the cake 130 comprising the build part 132 is positioned. The platform 111 is moveable with respect to the housing 181 of the build tank 180. When the build tank 180 is situated in the build tank chamber 190, the housing 181 of the build tank 180 is secured in place in the build tank chamber 190 and the platform 111 is engaged with the elevator stage 113 of the build elevator 110 such that the platform 111 (and hence the cake 130 and build part 132) can be raised with the build elevator 110 independent of the housing 181 of the build tank 180. In embodiments, flanges 182 proximate the bottom 183 of the build tank 180 are engaged with tank engagement features 184 to mechanically couple the build tank 180 to the build tank chamber 190. The tank engagement features 184 may be, for example, hydraulic or pneumatic cylinders moveable in a vertical direction with respect to the build tank chamber 190. In embodiments (not shown), the flanges 182 of the build tank 180 comprise connectors for coupling the tank engagement features 184 of the build tank chamber 190 to the flanges 182 of the build tank 180. The connectors may comprise interference fit connectors, pneumatic connectors, parallel groove connectors, or combinations of these.

Alternatively or additionally, in embodiments, the top 185 of the build tank 180 are mechanically coupled to the top 195 of the build tank chamber 190 (as shown in FIGS. 9A and 9B). In embodiments (not shown), the top 185 of the build tank 180 comprise connectors for coupling the top 195 of the build tank chamber 190 to the top 185 of the build tank. The connectors may comprise interference fit connectors, pneumatic connectors, parallel groove connectors, or combinations of these.

Referring again to FIG. 5, in embodiments, the build elevator 110 is slidably coupled to a sidewall 196 of the build tank chamber 190 with extendable guides 198 to facilitate sliding the build elevator 110 in and out of the build tank chamber 190. This allows for improved access to the build elevator 110, such as when a build tank is being placed on or removed from the build elevator 110 before or after a depowdering operation. In embodiments, the extendable guides 198 include telescopic linear guides with ball bearings, such as Telerace guides available from Rollon®, headquartered in New Jersey, USA. In embodiments (not shown), the build elevator 110 comprises connectors for coupling the platform 111 of the build tank 180 to the elevator stage 113 of the build elevator 110 (as shown in FIGS. 9A and 9B). The connectors may comprise interference fit connectors, pneumatic connectors, parallel groove connectors, or combinations of these.

Referring to FIGS. 1A and 9A, in embodiments, the build elevator 110 may have elevator sensors 112 for determining the location of the build elevator 110, and, in particular, the position of the platform 111. For example, the build elevator 110 may include elevator sensors 112 for detecting a vertical position of the build elevator 110 relative to the build inlet 220. The elevator sensors 112 may be positioned on the surface of the build elevator (as shown), for example, on the elevator stage 113 (as shown), or disposed within the build elevator 110 (not shown) to detect a height of the build elevator 110. In embodiments, the elevator sensors 112 may be positioned on the platform 111. Additionally or alternatively, in embodiments, elevator sensors 112 may be arranged around the build tank chamber 190 to detect a height of the build elevator 110 (or to detect a height of the platform 111) relative to the build inlet 220. The elevator sensors 112 may be positioned inside the build tank chamber 190 proximate to a lower end 192 of the build tank chamber 190 (not shown), proximate to an upper end 194 of the build tank chamber 190 (as shown), or in between the lower end 192 and the upper end 194 (not shown). The elevator sensors 112 may, in some embodiments, include a limit switch. In embodiments, the limit switch may comprise a capacitive limit switch, an inductive limit switch, a photoelectric limit switch, a mechanical limit switch, a pulse counter, an incremental sensor, a magnetic scale, or combinations thereof.

Figure 4A:
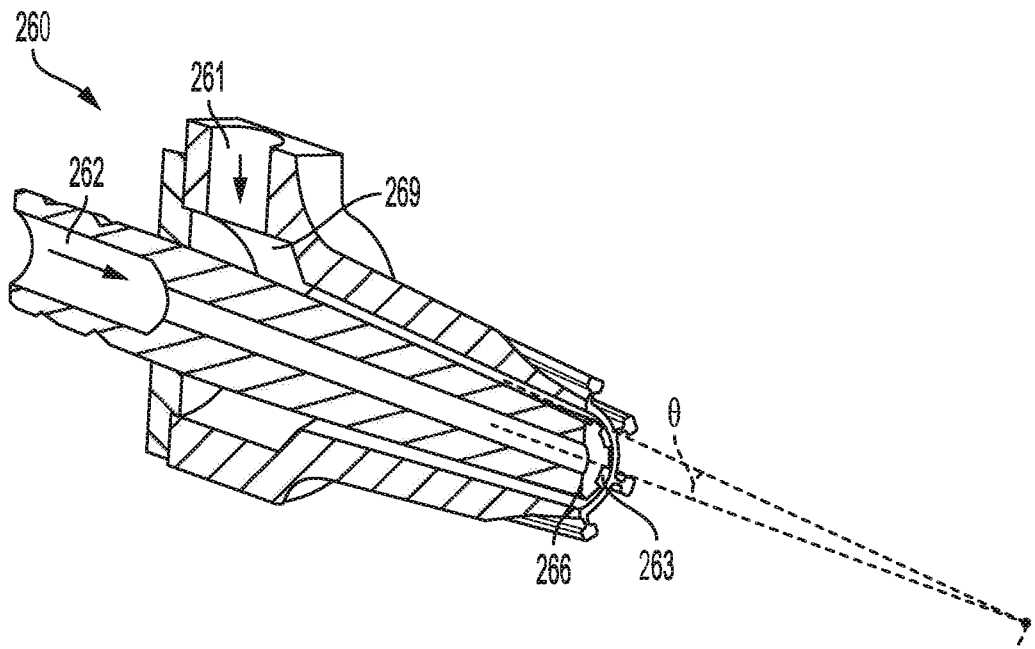
FIG. 4A schematically depicts a cross section of a handheld nozzle for use with a depowdering apparatus according to one or more embodiments shown and described herein.
Figure 4B:
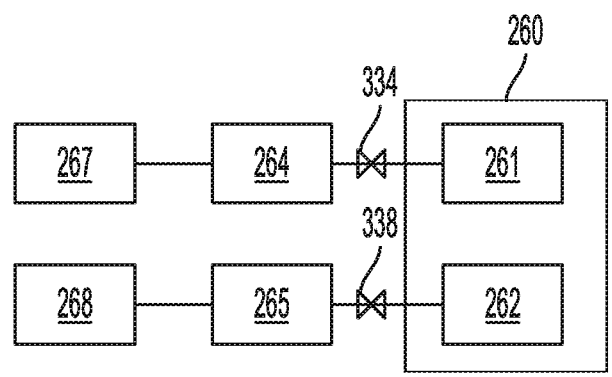
FIG. 4B depicts a block diagram of a nozzle system (including the handheld nozzle of FIG. 4A) for use with a depowdering apparatus according to one or more embodiments shown and described herein.

Referring to FIGS. 3, 4A, and 4B, in embodiments, the depowdering chamber 200 further includes a handheld nozzle 260 fluidly connected to a fluid supply 267 with a fluid supply conduit 264 and fluidly connected to an abrasive material supply 268 with an abrasive material supply conduit 265. In embodiments, the handheld nozzle 260 is mechanically coupled to the sidewall 290 of the depowdering chamber 200 (as shown). Alternatively, the handheld nozzle 260 is mechanically coupled to the top surface 240 of the depowdering chamber 200 (not shown) or the bottom surface 210 of the depowdering chamber 200 (not shown). In embodiments, the fluid supply 267 may include an air source, such as a compressed air source, which provides air to the handheld nozzle 260 through the fluid supply conduit 264. The abrasive material supply 268 may include abrasive material comprising organic or inorganic powder that is delivered to the handheld nozzle 260 through the abrasive material supply conduit 265. In embodiments, the abrasive material may be substantially similar to or the same as the build material of the cake 130 and the build material of the build part 132. The fluid supply 267 and the abrasive material supply 268 may be distinct from or the same as the fluid source 257 and the abrasive material source 258 previously described.

In embodiments, the handheld nozzle 260 may have an internal functionality substantially similar to or the same as the blast nozzle 300. The handheld nozzle 260 may comprise a handheld fluid inlet 261 fluidly connected to a handheld fluid outlet 263 and a handheld abrasive material inlet 262 fluidly connected to a handheld abrasive material outlet 266. In embodiments, the handheld nozzle 260 may further include a handheld fluid channel 269 fluidly connecting the handheld fluid inlet 261 fluidly connected to the handheld fluid outlet 263. The handheld nozzle 260 may have a handheld focal point 283 substantially similar to or the same as the focal point 340.

The handheld fluid inlet 261 is fluidly connected to the fluid supply 267 through the fluid supply conduit 264, and the handheld abrasive material inlet 262 is fluidly connected to the abrasive material supply 268 through the abrasive material supply conduit 265. A handheld valve 334 is fluidly coupled to the fluid supply conduit 264, to regulate the flow of the fluid from the fluid supply 267 to the handheld nozzle 260. In embodiments, the handheld valve 334 may comprise a pneumatic shut off valve or another type of pinch valve. In the embodiments described herein, the handheld valve 334 may be utilized to vary the pressure of the fluid stream emitted from the handheld nozzle 260.

An abrasive material supply valve 338 is fluidly coupled to the abrasive material supply conduit 265, to regulate the flow of the abrasive material from the abrasive material supply 368 to the handheld nozzle 360. In embodiments, the abrasive material supply valve 338 may comprise a pneumatic shut off valve or another type of pinch valve. The abrasive material supply valve 338 may be utilized to vary the pressure of the abrasive material entrained in the fluid stream emitted from the handheld nozzle 260. The handheld valve 334 and the abrasive material supply valve 338 may be the same as or substantially similar to any of the valves previously described.

Figure 8:
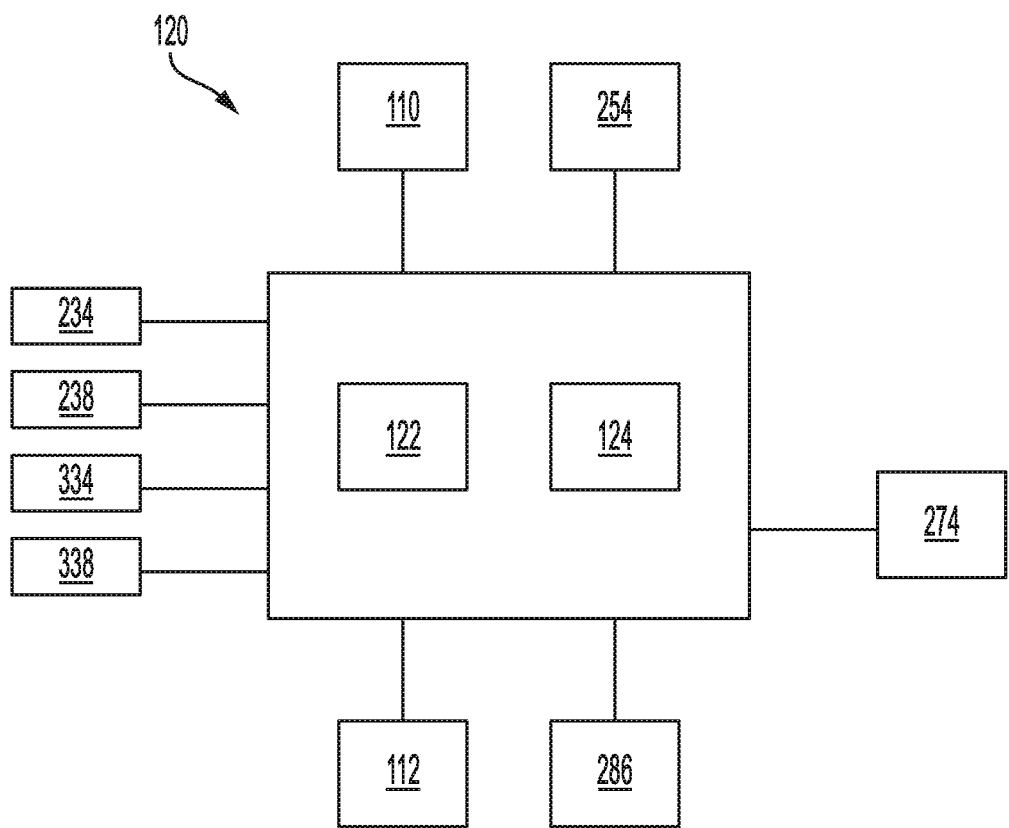
FIG. 8 is a block diagram of a control system for a depowdering apparatus according to one or more embodiments shown and described herein.

Referring to FIGS. 1A and 8, a control system 120 for controlling the depowdering apparatus 100 is schematically depicted. The control system 120 is communicatively coupled to the build elevator 110, the revolution actuator 254, the door sensor 274, the elevator sensors 112, the fluid control valve 234, the abrasive material source valve 238, the handheld valve 334, the abrasive material supply valve 338, and the air knife 286. Although the control system 120 is described as being a single control system, the use of multiple devices and/or systems to perform the functions described herein is contemplated.

In the embodiments described herein, the control system 120 comprises a processor 122 communicatively coupled to a memory 124. The processor 122 may include any processing component(s), such as a central processing unit or the like, configured to receive and execute computer readable and executable instructions stored in, for example, the memory 124. In the embodiments described herein, the computer readable and executable instructions for controlling the depowdering apparatus 100 are stored in the memory 124 of the control system 120. The memory 124 is a non-transitory computer readable memory. The memory 124 may be configured as, for example and without limitation, volatile and/or nonvolatile memory and, as such, may include random access memory (including SRAM, DRAM, and/or other types of random access memory), flash memory, registers, compact discs (CD), digital versatile discs (DVD), and/or other types of storage components.

In the embodiments described herein, the processor 122 of the control system 120 is configured to provide control signals to (and thereby actuate) the build elevator 110, the revolution actuator 254, the door sensor 274, the elevator sensors 112, the fluid control valve 234, the abrasive material source valve 238, the handheld valve 334, the abrasive material supply valve 338, and the air knife 286. The control system 120 may also be configured to receive signals from the build elevator 110, the fluid control valve 234, the revolution actuator 254, the door sensor 274, and the elevator sensors 112 and, based on these signals, actuate the build elevator 110, the fluid control valve 234, and the revolution actuator 254.

In embodiments, the blast nozzle 300 is configured to emit the blast stream 232 at variable pressure. The computer readable and executable instructions, when executed by the processor 122, regulate the pressure of the blast stream 232 emitted by the blast nozzle 300 with the fluid control valve 234. The pressure of the blast stream 232 may be adjusted in the range from 3 to 10 bar, from 3 to 8 bar, from 3 to 6 bar, from 3 to 4 bar, from 4 to 10 bar, from 4 to 8 bar, from 4 to 6 bar, from 6 to 10 bar, from 6 to 8 bar, or from 8 to 10 bar with the fluid control valve 234. In embodiments, the computer readable and executable instructions, when executed by the processor 122, regulate the pressure of the blast stream 232 in coordination with the actuation of the build elevator 110, the revolution rate of the blast nozzle 300, or combinations thereof.

In embodiments, the revolution actuator 254 is configured to rotate the blast nozzle 300 about the inlet axis 222 at a variable revolution rate. The computer readable and executable instructions, when executed by the processor 122, regulate the revolution rate of the blast nozzle 300 about the inlet axis 222 with the revolution actuator 254. The revolution rate may range from 1.5 to 15 revolutions per minute (rpm), from 1.5 to 13 rpm, from 1.5 to 10 rpm, from 1.5 to 8 rpm, from 1.5 to 6 rpm, from 1.5 to 4 rpm, from 1.5 to 2 rpm, from 2 to 15 rpm, from 2 to 13 rpm, from 2 to 10 rpm, from 2 to 8 rpm, from 2 to 6 rpm, from 2 to 4 rpm, from 4 to 15 rpm, from 4 to 13 rpm, from 4 to 10 rpm, from 4 to 8 rpm, from 4 to 6 rpm, from 6 to 15 rpm, from 6 to 13 rpm, from 6 to 10 rpm, from 6 to 8 rpm, from 8 to 15 rpm, from 8 to 13 rpm, from 8 to 10 rpm, from 10 to 15 rpm, from 10 to 13 rpm, or from 13 to 15 rpm. In embodiments, the computer readable and executable instructions, when executed by the processor 122, coordinate actuation of the build elevator 110 with the revolution rate of the blast nozzle 300 about the inlet axis 222 with the revolution actuator 254, the pressure of the blast stream 232 emitted by the blast nozzle 300, or combinations thereof.

In embodiments, the build elevator 110 is configured to raise the cake 130 comprising the build part 132 at a variable elevation rate. The computer readable and executable instructions, when executed by the processor 122, regulate the elevation rate of the build elevator 110. The elevation rate may range from 0.0001 to 0.01 meters per second (m/s), from 0.0005 to 0.01 m/s, from 0.001 to 0.01 m/s, from 0.005 to 0.01 m/s, from 0.0001 to 0.005 m/s, from 0.0005 to 0.005 m/s, from 0.001 to 0.005 m/s, from 0.0001 to 0.001 m/s, from 0.0005 to 0.001 m/s, or from 0.0001 to 0.0005 m/s. Additionally, in embodiments, the computer readable and executable instructions, when executed by the processor 122, coordinate the pressure of the blast stream 232 emitted by the blast nozzle 300 with the revolution rate of the blast nozzle 300, the elevation rate of the build elevator 110, or combinations thereof.

Referring to FIGS. 1A and 5-8, the computer readable and executable instructions, when executed by the processor 122, may receive a signal from the door sensor 274 indicating that the door assembly 272 is in either the closed position 276 or not in the closed position 276, as previously described. In embodiments, when the signal from the door sensor 274 indicates the door assembly 272 is not in the closed position 276, the computer readable and executable instructions, when executed by the processor 122, may stop or prevent the blast nozzle 300 from emitting the blast stream 232; stop or prevent the blast nozzle 300 from revolving around the inlet axis 222; stop or prevent the build elevator 110 from raising the cake 130 comprising the build part 132 through the build inlet 220; or combinations thereof.

The operation of the depowdering apparatus 100 will now be described in further detail with specific reference to FIGS. 1A, 8, 9A, and 9B.

Referring initially to FIG. 9A, depowdering apparatus 100 is shown at the initiation of a depowdering process. The depowdering process begins with positioning the cake 130 comprising the build part 132 on the build elevator 110. In embodiments, the cake 130 is positioned on the platform 111 of the build elevator 110 such that the cake 130 is centered around the inlet axis 222 of the build inlet 220 once the cake 130 is raised through the build inlet 220 by the build elevator 110.

Referring to FIGS. 9A and 9B, the cake 130 comprising the build part 132 is elevated with the build elevator 110 through the build inlet 220 and along the inlet axis 222 as indicated by the arrow. As the cake 130 comprising the build part 132 is raised through the build inlet 220 with the build elevator 110, the blast nozzle 300 revolves about the inlet axis 222.

While the blast nozzle 300 revolves about the inlet axis 222, the blast stream 232 is projected from the blast nozzle 300 toward the cake 130 comprising the build part 132. The blast stream 232 contacts the cake 130 and removes build material 134 from the cake 130 thereby exposing the build part 132, as shown in FIG. 9B. The build part 132 may be fully exposed, as shown in FIG. 9B, or may be partially exposed (not shown). The phrase "partially exposed," as used herein, means that some of the build material 134 of the cake 130 may remain on the build part 132.

As the build material 134 is removed from the cake 130 by the blast stream 232, the build material 135 (and abrasive material from the blast stream 232) collects at the recovery side 282 of the depowdering chamber 200 due to the downward slope of the bottom surface 210. In embodiments, the air curtain 288 emitted from air knife 286 aids in directing the build material 134 and abrasive material from the elevated side 280 to the recovery side 282 of the bottom surface 210. In embodiments, the build material 134 and the abrasive material may then be recycled using the recycling process 400 (shown in FIG. 1E) previously described.

Referring to FIGS. 8 and 9B, as previously described, the control system 120 is communicatively coupled to the build elevator 110, the revolution actuator 254, the door sensor 274, the elevator sensors 112, the fluid control valve 234, the abrasive material source valve 238, the handheld valve 334, the abrasive material supply valve 338, and the air knife 286. In embodiments, a computer-aided design (CAD) three-dimensional model of the geometry of the build part 132 is uploaded to the control system 120 and the control system 120 modifies the depowdering process based on the CAD model of the geometry of the build part 132 and the position of the build part 132 with respect to the build inlet 220.

For example, in embodiments, the computer readable and executable instructions, when executed by the processor 122, vary the pressure of the blast stream 232 emitted by the blast nozzle 300 based on the geometry of the build part 132 and the position of the build part 132 relative to the build inlet 220; vary the revolution rate of the blast nozzle 300 about the inlet axis 222 based on the geometry of the build part 132 and the position of the build part 132 relative to the build inlet 220; vary the elevation rate of the build elevator 110 based on the geometry of the build part 132 and the position of the build part 132 relative to the build inlet 220; or combinations thereof.

By way of further example, and not by way of limitation, the control system may modify the pressure of the blast stream 232, the revolution rate of the blast nozzle 300, and the elevation rate of the build elevator 110 as shown in Table 1.

TABLE 1

Geometry-Dependent Depowdering Process Modifications

| Geometry Feature | Fluid Stream Pressure | Blast Nozzle Revolution Rate | Build Elevator Elevation Rate |
| --- | --- | --- | --- |
| Smooth profile | Decrease | Increase | Increase |
| Rough profile | Increase | Decrease | Decrease |
| Part breadth - wide | Decrease | N/A | N/A |
| Part breadth - narrow | Increase | N/A | N/A |

Without intending to be bound by theory, when the build part 132 has a smooth surface profile, it is believed that it requires less pressure to remove the build material 134 of the cake 130 from the build part 132 because the build material 134 more easily falls away from the smooth surface rather than becoming entrapped or adhered to surface features. However, when the build part 132 has a rough surface profile, such as when the build part 132 has a variety of large and/or small surface features, it is believed that it requires greater pressure to dislodge the build material 134 of the cake 130 from the build part 132 because the build material 134 may become lodged within the surface features of the build part 132. Accordingly, the pressure of the blast stream 232 emitted by the blast nozzle 300 may be varied based on the geometry of the build part 132 that is exposed to the blast stream 232 of the blast nozzle 300 as the cake 130 is raised through the build inlet 220.

Similarly, when the build part 132 has a smooth surface profile, the blast nozzle revolution rate may be increased because the build material 134 may more easily fall away from the build part 132. However, when the build part 132 has a rough surface profile, the blast nozzle revolution rate may be decreased because the build material 134 may become lodged within the rough surface of the build part 132 and may require longer contact time with the fluid stream to dislodge from the rough surface of the build part 132.

Regarding the elevation rate of the build elevator 110, the elevation rate may be increased when the build part 132 has a smooth surface profile as the build material 134 may more easily fall away from the build part 132 thereby requiring less exposure time to the blast stream 232 emitted by the blast nozzle. In embodiments, the revolution rate of the blast nozzle 300 and the elevation rate of the build elevator 110 is directly related such that when the revolution rate increases, the elevation rate increases, and when the revolution rate decreases, the elevation rate decreases.

When the build part 132 has a wide breadth, meaning that the surface(s) of the build part 132 is relatively close to the blast nozzle 300, it is believed that it requires less pressure to remove the build material 134 of the cake 130 from the build part 132 than if the surface of the build part 132 were farther away from the blast nozzle 300 (i.e., when the build part 132 has a narrow breadth). Similarly, when the build part 132 has a narrow breadth, meaning that the surface of the build part 132 is relatively far from the blast nozzle 300, it is believed that it requires greater pressure to remove the build material 134 of the cake 130 from the build part 132 than if the surface of the build part 132 were closer to the blast nozzle 300.

It is contemplated that the breadth of the build part 132 (i.e. the proximity of the surface of the build part 132 to the blast nozzle 300) may vary over the course of a single revolution of the blast nozzle 300 about the inlet axis 222, and that the pressure of the blast stream 232 may likewise vary in accordance with the geometry of the build part 132, specifically the breadth of the build part 132, as the blast nozzle 300 is rotated about the inlet axis 222.

Referring to FIGS. 3, 5-8, and 9B, in embodiments in which the build part 132 is partially exposed, the handheld nozzle 260 (shown in FIG. 3), is used to remove the remaining build material 134 from the build part 132. An operator may manually access the handheld nozzle 260 through the access port 270 when the door assembly 272 is in the open position 278. As previously described, the control system 120 (shown in FIG. 8) determines if the door assembly 272 is in the closed position 276 or the open position 278. If the signal from the door sensor 274 indicates the door assembly 272 is not in the closed position 276, the control system 120 stops or prevents the blast nozzle 300 from at least one of emitting the blast stream 232 and revolving around the inlet axis 222. This prevents the operator from interfering with the depowdering process and vice-versa.

Further aspects of the embodiments are provided by the subject matter of the following clauses:

Clause 1. A blast nozzle for a depowdering apparatus comprises an abrasive material inlet fluidly connected to an abrasive material outlet; and a fluid inlet fluidly connected to a fluid outlet, wherein: the fluid outlet at least partially surrounds the abrasive material outlet; and the fluid outlet is angled with respect to the abrasive material outlet and configured to emit a fluid stream directed to a focal point, the focal point being laterally spaced apart from the blast nozzle in a fluid flow direction.

Clause 2. The blast nozzle of any preceding clause wherein the abrasive material outlet is configured to emit an abrasive material stream directed to the focal point.

Clause 3. The blast nozzle of any preceding clause wherein the abrasive material stream and the fluid stream intermix at the focal point and form a blast stream comprising fluid comprising abrasive material entrained in the blast stream.

Clause 4. The blast nozzle of any preceding clause further comprising a fluid channel fluidly connecting the fluid inlet to the fluid outlet, the fluid channel at least partially surrounding the abrasive material inlet.

Clause 5. The blast nozzle of any preceding clause further comprising an abrasive material conduit fluidly coupled to the abrasive material inlet to supply an abrasive material to the abrasive material outlet.

Clause 6. The blast nozzle of any preceding clause wherein the abrasive material comprises organic powder, inorganic powder, or both.

Clause 7. The blast nozzle of any preceding clause wherein abrasive material comprises inorganic powder comprising metal alloy powder, stainless steel powder, titanium alloy powder, cobalt alloy powder, copper alloy powder, diamond catalyst alloy powder, nickel alloy powder, or combinations thereof.

Clause 8. The blast nozzle of any preceding clause further comprising a fluid conduit fluidly coupled to the fluid inlet to supply the fluid stream to the fluid outlet.

Clause 9. The blast nozzle of any preceding clause further comprising a fluid supply fluidly coupled to the fluid conduit.

Clause 10. The blast nozzle of any preceding clause wherein the fluid supply comprises an air source comprising compressed air.

Clause 11. The blast nozzle of any preceding clause wherein the blast nozzle comprises metal, a metallic alloy, polymers, ceramics, or combinations thereof.

Clause 12. A depowdering apparatus comprises a depowdering chamber comprising a bottom surface and a build inlet extending through the bottom surface, the build inlet comprising an inlet axis that is substantially vertically oriented; and a blast nozzle comprising an abrasive material inlet fluidly connected to an abrasive material outlet and a fluid inlet fluidly connected to a fluid outlet, the fluid outlet at least partially surrounding and angled with respect to the abrasive material outlet and configured to emit a fluid stream directed to a focal point, the focal point being laterally spaced apart from the blast nozzle in a fluid flow direction, wherein the blast nozzle is positioned within the depowdering chamber, laterally spaced apart from the inlet axis, and oriented to direct a blast stream toward the inlet axis.

Clause 13. The apparatus of any preceding clause further comprising a build elevator arranged below the build inlet in a vertical direction, wherein the build elevator is operable to raise a cake comprising a build part through the build inlet and into the depowdering chamber along the inlet axis as the blast nozzle directs the blast stream towards the inlet axis.

Clause 14. The apparatus of any preceding clause wherein the abrasive material outlet of the blast nozzle is configured to emit an abrasive material stream directed to the focal point.

Clause 15. The apparatus of any preceding clause wherein the abrasive material stream and the fluid stream intermix at the focal point and form the blast stream, the blast stream comprising fluid comprising abrasive material entrained in the blast stream.

Clause 16. The apparatus of any preceding clause wherein the blast nozzle further comprises a fluid channel fluidly connecting the fluid inlet to the fluid outlet, the fluid channel at least partially surrounding the abrasive material inlet.

Clause 17. The apparatus of any preceding clause further comprising an abrasive material conduit fluidly coupled to the abrasive material inlet of the blast nozzle to supply abrasive material to the abrasive material outlet.

Clause 18. The apparatus of any preceding clause wherein the abrasive material comprises organic powder, inorganic powder, or both.

Clause 19. The apparatus of any preceding clause wherein abrasive material comprises inorganic powder comprising metal alloy powder, stainless steel powder, titanium alloy powder, cobalt alloy powder, copper alloy powder, diamond catalyst alloy powder, nickel alloy powder, or combinations thereof.

Clause 20. The apparatus of any preceding clause further comprising a fluid conduit fluidly coupled to the fluid inlet of the blast nozzle to supply the fluid stream to the fluid outlet.

Clause 21. The apparatus of any preceding clause further comprising a fluid supply fluidly coupled to the fluid conduit.

Clause 22. The apparatus of any preceding clause wherein the fluid supply comprises an air source comprising compressed air.

Clause 23. The apparatus of any preceding clause wherein the blast nozzle comprises metal, a metallic alloy, polymers, ceramics, or combinations thereof.

Clause 24. The apparatus of any preceding clause wherein the blast nozzle is operable to revolve about the inlet axis on a travel path encircling the inlet axis and the build elevator is operable to raise the cake comprising the build part through the build inlet and into the depowdering chamber along the inlet axis as the blast nozzle is revolved about the inlet axis on the travel path.

Clause 25. The apparatus of any preceding clause wherein the blast nozzle is rotatably coupled to a top surface of the depowdering chamber with an arm assembly comprising a first revolvable arm, wherein the first revolvable arm is operable to revolve the blast nozzle about the inlet axis on the travel path.

Clause 26. The apparatus of any preceding clause wherein: the blast nozzle is laterally spaced from a perimeter of the build inlet and the first revolvable arm is operable to revolve the blast nozzle about the perimeter of the build inlet; the first revolvable arm comprises a fluid conduit and an abrasive material conduit which are fluidly coupled to the blast nozzle to supply the blast stream to the blast nozzle; the fluid conduit is fluidly coupled to a fluid source; the abrasive material conduit is fluidly coupled to an abrasive material source; and the blast stream comprises fluid comprising abrasive material entrained in the fluid.

Clause 27. The apparatus of any preceding clause further comprising a control system communicatively coupled to the build elevator and a revolution actuator coupled to the arm assembly, the control system comprising a processor and a non-transitory memory storing computer readable and executable instructions that, when executed by the processor, provide control signals to the revolution actuator and the build elevator such that rotation of the blast nozzle about the inlet axis with the revolution actuator is coordinated with elevation of the build elevator.

Clause 28. The apparatus of any preceding clause wherein the control system is communicatively coupled to a fluid control valve fluidly coupled to the blast nozzle, wherein the computer readable and executable instructions, when executed by the processor, cause the fluid control valve to coordinate a pressure of the blast stream emitted by the blast nozzle with rotation of the blast nozzle about the inlet axis with the revolution actuator and elevation of the build elevator.

Clause 29. The apparatus of any preceding clause wherein: the arm assembly further comprises a second revolvable arm spaced apart from the first revolvable arm; a blast shield is rotatably coupled to the top surface of the depowdering chamber with the second revolvable arm, the blast shield being arranged on the second revolvable arm such that the blast stream from the blast nozzle is directed towards the blast shield; the second revolvable arm is operable to revolve the blast shield about the inlet axis on the travel path; and the blast stream from the blast nozzle comprises fluid comprising abrasive material entrained in the fluid and the blast shield is formed from the same material as the abrasive material.

Clause 30. The apparatus of any preceding clause wherein the depowdering chamber further comprises a handheld nozzle comprising a second abrasive material inlet fluidly connected to a second abrasive material outlet; and a second fluid inlet fluidly connected to a second fluid outlet, wherein: the second fluid outlet at least partially surrounds the second abrasive material outlet; and the second fluid outlet is angled with respect to the second abrasive material outlet and configured to emit a second fluid stream directed to a second focal point, the second focal point being laterally spaced apart from the handheld nozzle in a fluid flow direction.

Clause 31. The apparatus of any preceding clause wherein: the build elevator comprises elevator sensors communicatively coupled to a control system to detect a height of the build elevator relative to the build inlet; the build elevator is disposed within a build tank chamber, the build tank chamber having elevator sensors arranged around the build tank chamber to detect a height of the build elevator relative to the build inlet; and the build elevator and the elevator sensors are communicatively coupled to a control system and the build elevator is configured to have a variable elevation rate.

Clause 32. The apparatus of any preceding clause.

Clause 33. A method for depowdering a cake comprising a build part, the method comprising: positioning the cake comprising the build part on a build elevator; elevating the cake comprising the build part with the build elevator through a build inlet extending through a bottom surface of a depowdering chamber and along an inlet axis that is substantially vertically oriented; positioning a blast nozzle within the depowdering chamber, wherein the blast nozzle comprises an abrasive material inlet fluidly connected to an abrasive material outlet and a fluid inlet fluidly connected to a fluid outlet, the fluid outlet is at least partially surrounding and angled with respect to the abrasive material outlet and is configured to emit a fluid stream directed to a focal point, the focal point is laterally spaced apart from the blast nozzle in a fluid flow direction, and the blast nozzle is laterally spaced apart from the inlet axis; and projecting a blast stream from the blast nozzle toward the cake comprising the build part, wherein the blast stream removes powder material from the cake thereby exposing the build part.

Clause 34. The method of any preceding clause wherein projecting the blast stream further comprises projecting a fluid stream from the fluid outlet of the blast nozzle toward the focal point.

Clause 35. The method of any preceding clause wherein projecting the blast stream further comprises projecting an abrasive material stream from the abrasive material outlet of the blast nozzle toward the focal point.

Clause 36. The method of any preceding clause wherein projecting the blast stream further comprises allowing the abrasive material stream and the fluid stream to intermix at the focal point to form the blast stream, the blast stream comprising fluid comprising abrasive material entrained in the blast stream.

Clause 37. The method of any preceding clause further comprising varying a pressure of the blast stream incident on the cake, varying an elevation rate of the cake, or both, based on a geometry of the build part.

Clause 38. The method of any preceding clause further comprising: revolving the blast nozzle about the inlet axis on a travel path encircling the inlet axis as the cake comprising the build part is raised through the build inlet with the build elevator; and projecting the blast stream from the blast nozzle toward the cake comprising the build part while revolving the blast nozzle about the inlet axis.

Clause 39. The method of any preceding clause wherein the blast nozzle is rotatably coupled to a top surface of the depowdering chamber with an arm assembly comprising a first revolvable arm, and wherein revolving the blast nozzle comprises revolving the first revolvable arm, further comprising varying a revolution rate of the arm assembly based on a geometry of the build part.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

What is claimed is:

1. A depowdering apparatus comprising:
   a depowdering chamber comprising a bottom surface, a powder recovery outlet provided at the bottom surface, the bottom surface continuously downwardly sloped toward the powder recovery outlet, a top surface opposite the bottom surface, and a build inlet extending through the bottom surface, the build inlet comprising an inlet axis that is substantially vertically oriented;
   a revolution actuator provided at the top surface;
   a first revolvable arm extending from the revolution actuator, the first revolvable arm revolvable around the inlet axis by the revolution actuator; and
   a blast nozzle provided at an end of the first revolvable arm opposite the revolution actuator, the blast nozzle comprising an abrasive material inlet fluidly connected to an abrasive material outlet and a fluid inlet fluidly connected to a fluid outlet, the fluid outlet at least partially surrounding and angled with respect to the abrasive material outlet and configured to emit a fluid stream directed to a focal point, the focal point being laterally spaced apart from the blast nozzle in a fluid flow direction, wherein the blast nozzle is positioned within the depowdering chamber, laterally spaced apart from the inlet axis, and oriented to direct a blast stream toward the inlet axis.

2. The depowdering apparatus of claim 1, further comprising a build elevator arranged below the build inlet in a vertical direction, wherein the build elevator is operable to raise a cake comprising a build part through the build inlet and into the depowdering chamber along the inlet axis as the blast nozzle directs the blast stream towards the inlet axis.

3. The depowdering apparatus of claim 1, wherein the abrasive material outlet of the blast nozzle is configured to emit an abrasive material stream directed to the focal point.

4. The depowdering apparatus of claim 3, wherein the abrasive material stream and the fluid stream intermix at the focal point and form the blast stream, the blast stream comprising fluid comprising abrasive material entrained in the blast stream.

5. The depowdering apparatus of claim 1, wherein the blast nozzle further comprises a fluid channel fluidly connecting the fluid inlet to the fluid outlet, the fluid channel at least partially surrounding the abrasive material inlet.

6. The depowdering apparatus of claim 1, further comprising an abrasive material conduit fluidly coupled to the abrasive material inlet of the blast nozzle to supply abrasive material to the abrasive material outlet, wherein the abrasive material comprises organic powder, inorganic powder, or both.

7. The depowdering apparatus of claim 6, wherein abrasive material comprises inorganic powder comprising metal alloy powder, stainless steel powder, titanium alloy powder, cobalt alloy powder, copper alloy powder, diamond catalyst alloy powder, nickel alloy powder, or combinations thereof.

8. The depowdering apparatus of claim 1:
   further comprising a fluid conduit fluidly coupled to the fluid inlet of the blast nozzle to supply the fluid stream to the fluid outlet;
   further comprising a fluid supply fluidly coupled to the fluid conduit;
   wherein the fluid supply comprises an air source comprising compressed air; and
   wherein the blast nozzle comprises metal, a metallic alloy, polymers, ceramics, or combinations thereof.

9. The depowdering apparatus of claim 1, further comprising:
   a second revolvable arm extending from the revolution actuator, the second revolvable arm revolvable around the inlet axis by the revolution actuator; and
   a blast shield provided at an end of the second revolvable arm opposite the revolution actuator.

10. The depowdering apparatus of claim 9, wherein a blast stream from the blast nozzle is directed toward the blast shield as the second revolvable arm is revolved about the inlet axis.

11. The depowdering apparatus of claim 9, wherein the blast shield has a concave profile relative to the inlet axis.

12. The depowdering apparatus of claim 1, further comprising an air knife provided at the elevated side of the bottom surface of the depowdering chamber to direct an air current from the elevated side toward the recovery side of the bottom surface.

* * * * *